United States Patent
Hori et al.

(10) Patent No.: US 6,374,039 B1
(45) Date of Patent: Apr. 16, 2002

(54) IMAGE PICKUP APPARATUS

(75) Inventors: Taizo Hori; Hidetoshi Wada, both of Yokohama; Izumi Matsui, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/121,058

(22) Filed: Jul. 23, 1998

(30) Foreign Application Priority Data

Jul. 25, 1997 (JP) .............................................. 9-200217
Jul. 1, 1998 (JP) ........................................... 10-186145

(51) Int. Cl.⁷ ................................................ H04N 5/77
(52) U.S. Cl. ....................................... 386/117; 358/906
(58) Field of Search ............................. 386/46, 95, 96, 386/98, 111, 112, 109, 107, 117, 124; 358/906, 909.1; 348/14.1, 220; H04N 5/76, 5/77

(56) References Cited

U.S. PATENT DOCUMENTS

| | | | | |
|---|---|---|---|---|
| 5,442,455 A | * | 8/1995 | Hioki et al. ................. | 386/112 |
| 5,479,264 A | * | 12/1995 | Ueda et al. ................. | 386/111 |
| 5,488,433 A | * | 1/1996 | Washino et al. .............. | 386/52 |
| 5,867,629 A | * | 2/1999 | Otsuka ....................... | 386/112 |
| 5,969,750 A | * | 10/1999 | Hsieh et al. ............... | 348/14.1 |
| 5,995,705 A | * | 11/1999 | Lang .......................... | 386/46 |
| 6,011,583 A | * | 1/2000 | Hieda et al. ................ | 348/220 |
| 6,104,861 A | * | 8/2000 | Tsukagoshi .................. | 386/96 |

FOREIGN PATENT DOCUMENTS

JP         8-205193         8/1996

* cited by examiner

Primary Examiner—Huy Nguyen
(74) Attorney, Agent, or Firm—Fitzpatrick, Cella, Harper & Scinto (57) ABSTRACT

There is disclosed an image pickup apparatus which outputs moving image information, obtained with an image pickup device of progressive scanning type, as video signals of two channels, compresses the amount of information of the video signals of the two channels with compressing units of two channels, and transmits the compressed video signals of two channels to a peripheral device in the compressed state.

22 Claims, 9 Drawing Sheets

IMAGE PICKUP APPARATUS

BACKGROUND OF THE INVENTION

1. Field of the Invention

The present invention relates to an image pickup apparatus, and more particularly to the processing of a video signal obtained from an image pickup device of progressive scan type.

2. Related Background Art

For processing the video signal picked up by a video camera, there has already been known a camcorder. In the conventional apparatus with the NTSC system, the image is recorded and reproduced in interlaced manner at a rate of 60 fields (30 frames) per second.

In case of reproducing a still image in such apparatus, the two fields constituting the image of a frame has a time difference of $1/60$ seconds, so that the image may be blurred because of the difference between the field images in case of a fast moving object.

For this reason, in case of reproducing a still image it is conceivable to output a field image, but the resolution in the vertical direction is inevitably lowered in such case.

For resolving such drawback, the Japanese Patent Laid-open Application No. 8-205193 proposes, for avoiding the loss of the resolving power in the vertical direction in the interpolation with the image of the other field in a frame, to detect the image movement between the fields and to effect the interpolation with the image of the other field in the frame in an image portion without movement but to effect the interpolation with the image of the same field in an image portion involving movement.

Such method, however, can only increase the vertical resolving power only in portions without movement within the image, and the vertical resolving power still remains low in the portions involving movement.

Besides, the above-described method is unable to avoid the loss of the resolving power in case of slow reproduction, since it is basically used for a moving object. A similar drawback is also encountered in case so-called electronic zooming is executed at the reproduction.

Recently, for the image pickup device of the camcorder, there is being commercialized a CCD of progressive scanning type capable of providing non-interlaced images of 60 frames per second (hereinafter called progressive CCD). The image obtained with such progressive CCD shows little blur in the moving portion of the image even in case of slow reproduction and is free from loss of the vertical resolving power.

However, because of the limitation in the data rate in the recording and reproduction, the conventional camcorder is unable to record all the images of 60 frames per second obtained with such progressive CCD (such images being hereinafter called progressive images). For this reason, in the ordinary moving image pickup mode, the images are recorded by conversion into interlaced images of 60 fields, and, only in the still image pickup mode, there are recorded progressive images of 30 fields.

Therefore, the aforementioned drawbacks are again encountered in case the images recorded in the moving image pickup mode are reproduced as a still image or are slow reproduced.

On the other hand, in such camcorders, the digital video cassette recorders which record the video signal in the digital form are becoming dominant.

Such digital video cassette recorders, because of the feature of handling the image information in the form of digital signals, match well with computers and are recently often utilized for image fetching in the personal computers. The image monitors of the personal computers are mostly displays of progressive scan type. However, as explained in the foregoing, the camcorders including digital ones record and reproduce the interlaced images, so that the taken moving images have to be converted into non-interlaced images in order to be displayed on the monitor of the personal computer. Such conversion results in the deterioration of the image quality as explained in the foregoing, and satisfactory image cannot be displayed.

Consequently, the currently employed progressive CCD has not been effectively utilized.

SUMMARY OF THE INVENTION

An object of the present invention is to resolve the drawbacks mentioned above.

Another object of the present invention is to provide a satisfactory image without blur even in case the image involves movement.

Still another object of the present invention is to enable display of a satisfactory image in a progressive monitor.

The above-mentioned objects can be attained, according to an embodiment of the present invention, by an imaging apparatus comprising:

image pickup means for outputting moving image information, obtained with an image pickup device of progressive scan type, in the form of video signals of two channels;

compression means of two systems for respectively compressing the amount of information of the video signals of two channels outputted from the image pickup means; and transmission means for transmitting, in the compressed state, the video signals of two channels compressed by the compression means of two systems.

Still other objects of the present invention, and the features thereof, will become fully apparent from the following detailed description of the embodiment, to be taken in conjunction with the attached drawings.

DETAILED DESCRIPTION OF THE PREFERRED EMBODIMENTS

Now the present invention will be clarified in detail by embodiments thereof, with reference to the attached drawings.

Figure 1:
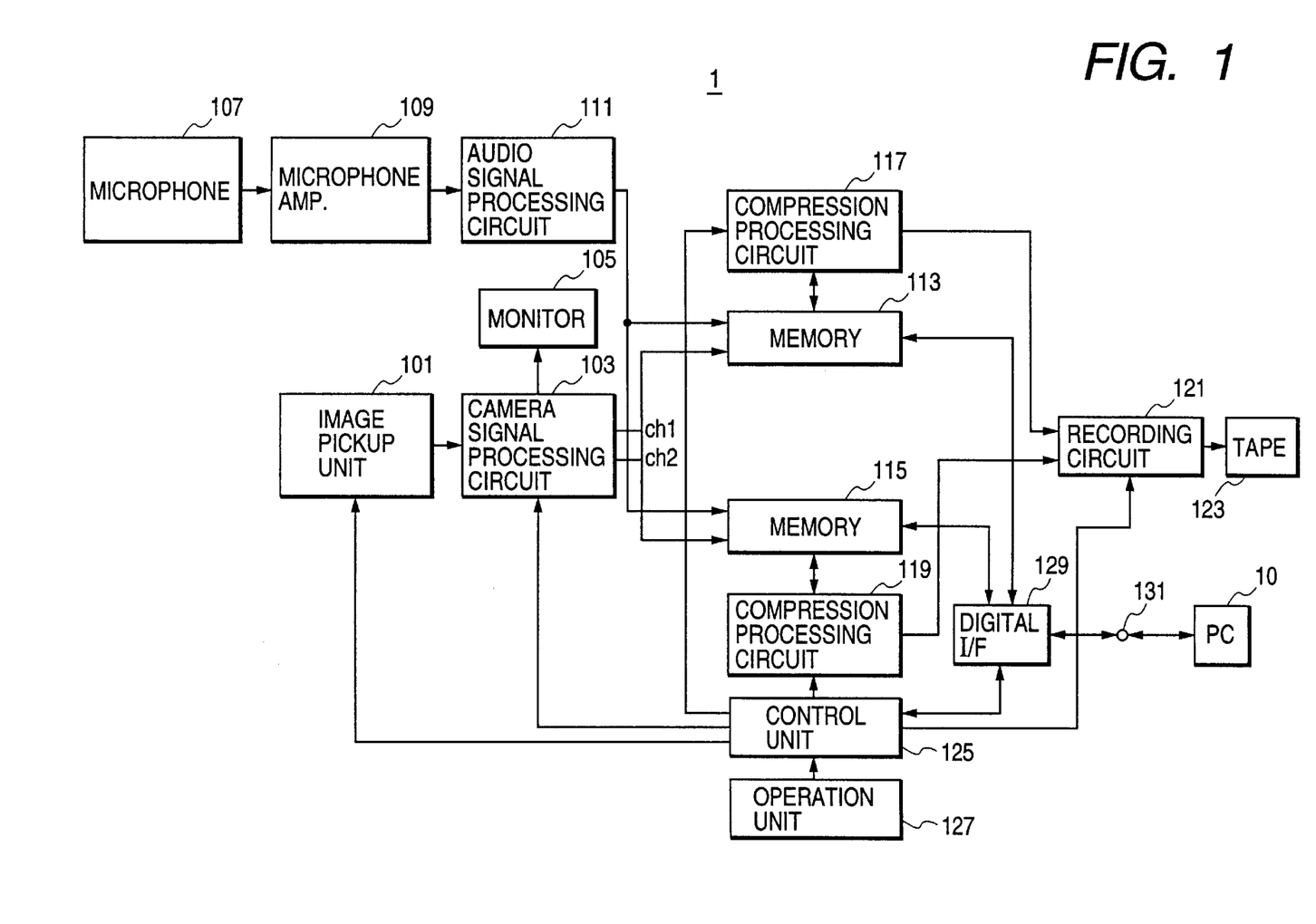
FIG. 1 is a block diagram showing the configuration of the recording system of a video cassette recorder in which the present invention is applicable.

FIG. 1 is a block diagram showing the configuration of the recording system of a camcorder in which the present invention is applicable.

Referring to FIG. 1, an image pickup unit 101 picks up the image of an object with the aforementioned progressive CCD and outputs the obtained image information to a camera signal process circuit 103 in the form of progressive images.

Figure 2:
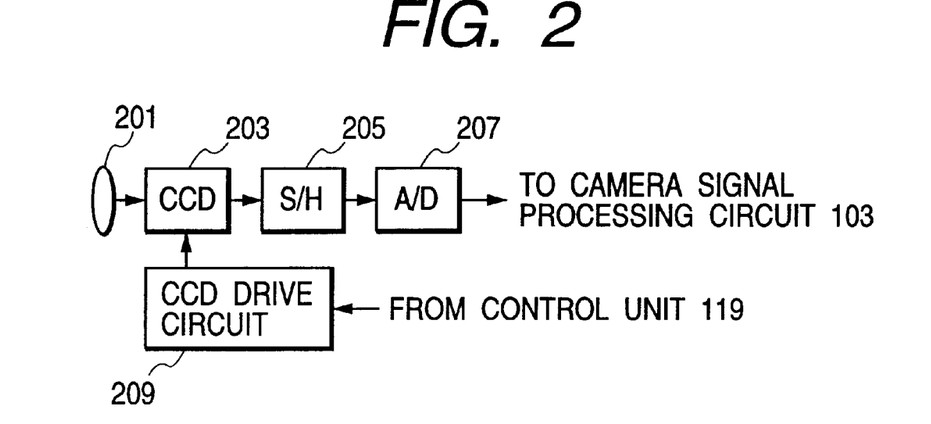
FIG. 2 is a block diagram showing the configuration of the image pickup unit shown in FIG. 1.

The configuration of the image pickup unit 101 is shown in FIG. 2.

As explained in the foregoing, the progressive CCD employed in the present embodiment is so constructed as to read and output the image information of all the pixels on the image pickup plane within the time of a field ($1\frac{1}{60}$ seconds), and may have the output of one channel or two channels.

The present embodiment employs a progressive CCD with a single output channel.

Referring to FIG. 2, the light coming from an object, through an optical system 201 including lenses, an iris etc., irradiates a CCD 203. The CCD 203, of which drive timing is controlled by a CCD drive circuit 209 under the control of a control unit 125, outputs all the pixels of the image pickup plane in the order of raster scanning within a field period. The output image information is so sampled by a sample-hold circuit 205 as to attain a predetermined pixel arrangement, then converted by an A/D converter 207 into a digital signal of plural bits per sample, and outputted to the camera signal process circuit 103.

Figure 3:
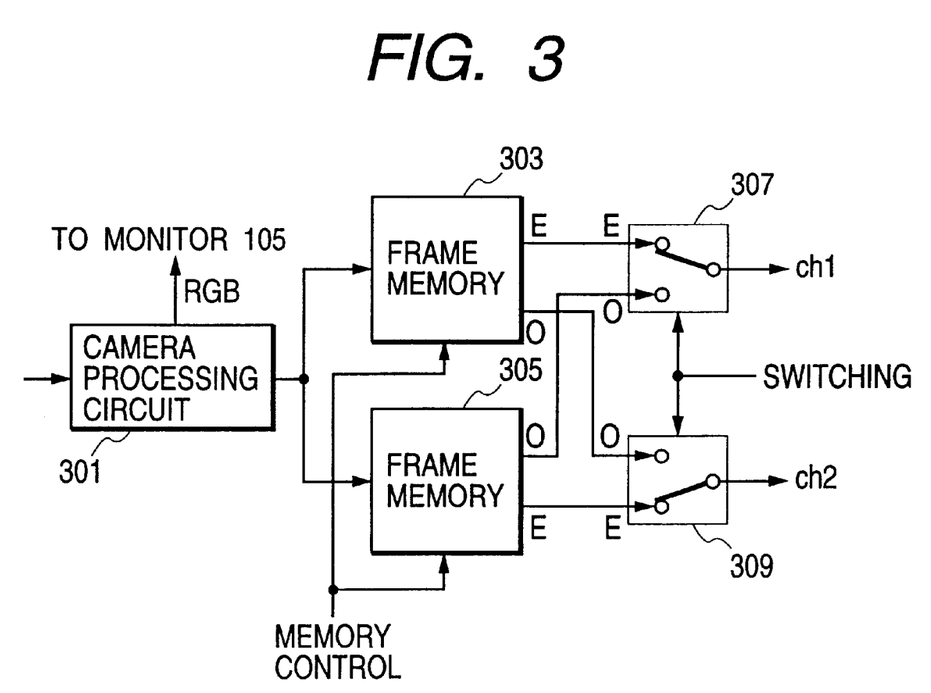
FIG. 3 is a circuit diagram showing the configuration of a camera signal processing circuit shown in FIG. 1.

FIG. 3 shows the configuration of the camera signal process circuit 103.

Referring to FIG. 3, a camera process circuit 301 applies processes such as gamma correction, color separation, white balancing etc., to the digital video signal of the progressive images obtained by the image pickup unit 101, and outputs the result to frame memories 303, 305. It also supplies a monitor 105 with a video signal in the form of RGB signals.

The frame memories 303, 305 are respectively subjected to writing control by the control unit 125 in such a manner that they alternately assume the write-in state and the read-out state for every entry of the video signal of a frame (every $\frac{1}{60}$ seconds in the present embodiment). Also each of the memories 303, 305 has two output ports, which respectively output the video signals of odd-numbered lines and the even-numbered lines of a frame, in parallel manner.

Thus, when the frame memory 305 is in the write-in state, the video signal from the even line port E of the frame memory 303 is supplied to a terminal E of a switch 307, while the video signal from the odd line port O is supplied to a terminal O of a switch 309. Similarly, when the frame memory 303 is in the write-in state, the video signal from the even line port E of the frame memory 305 is supplied to a terminal E of the switch 309, while the video signal from the odd line port O is supplied to a terminal O of the switch 307.

The switches 307, 309 are so switched by the control unit 125 in such a manner as to be alternately connected to the terminal E and terminal O to output the video signals of channels 1 and 2.

Figure 4:
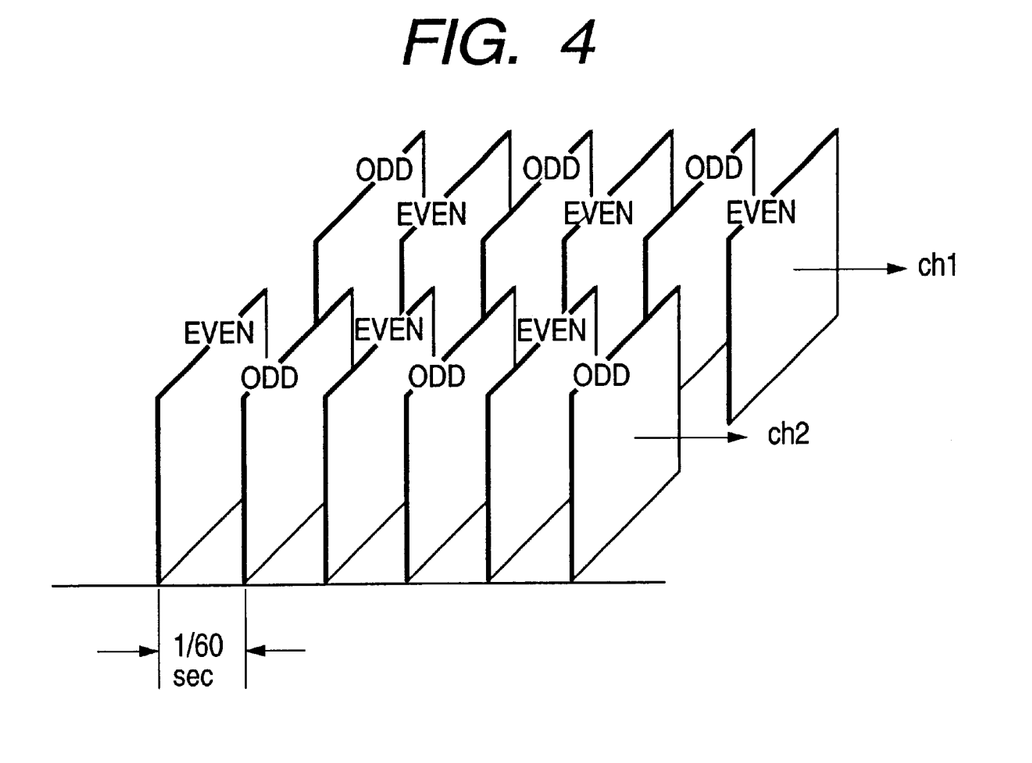
FIG. 4 is a view showing the video signals outputted from the camera signal process circuit in FIG. 1.

FIG. 4 shows the video signals of the channels 1 and 2 outputted from the camera signal process circuit 103.

As shown in FIG. 4, the mutually opposite fields are switched at every 1/60 seconds in such a manner that, when the video signal of the channel 1 is outputted in the order of even field—odd field—even field—odd field, the video signal of the channel 2 is outputted in the order of odd field—even field—odd field—even field. As shown in FIG. 4, the video signal of each channel can be considered as independent interfaced images of 60 fields per second.

The video signals of the channels 1 and 2 outputted from the camera signal process circuit 103 are respectively supplied to the memories 113, 115. The video signals stored in the memories 113, 115 are respectively subjected to compression, encoding etc. in compression process circuits 117, 119 and are supplied a recording circuit 121 and a digital I/F 129.

In the following there will be explained the compression process circuits 117, 119.

Figure 5:
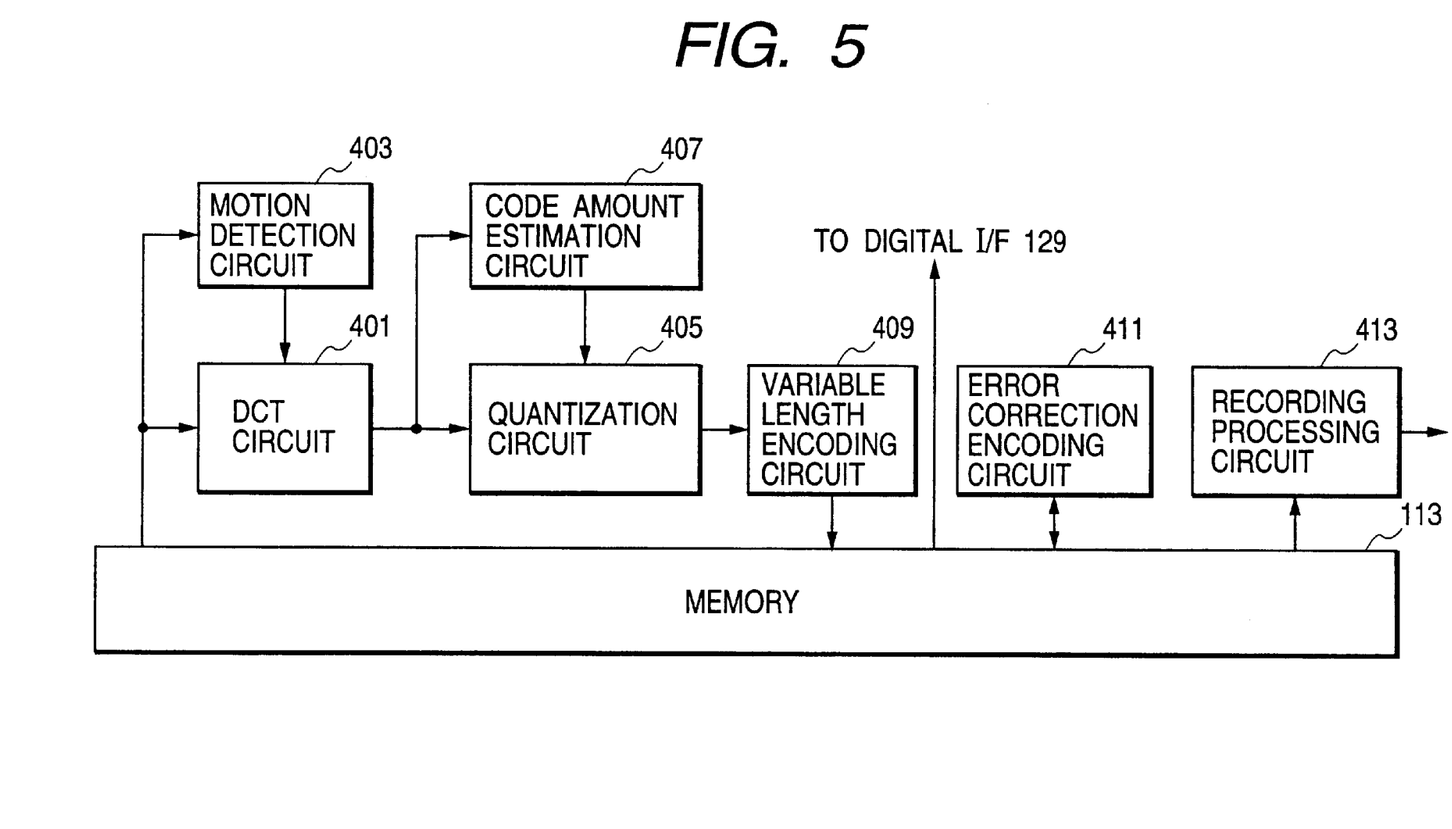
FIG. 5 is a block diagram showing the configuration of a compression process circuit in FIG. 1.

FIG. 5 shows the configuration of a principal part of the apparatus shown in FIG. 1, including the compression process circuit 117 and the memory 113. Though FIG. 5 shows the compression process circuit 117 only, a similar configuration is provided also for the compression process circuit 119, which will not be explained further.

Referring to FIG. 5, the video signal stored in the memory 113 is outputted, in a predetermined order and in blocks, each consisting of 8 pixels in the horizontal direction and 8 pixels in the vertical direction, to a DCT circuit 401 and a motion detection circuit 403. The motion detection circuit 403 detects the movement of image between the fields in each block, and sends the result of detection to the DCT circuit 401, which applies a DCT process on the video signal from the memory 113 according to the result of detection of the motion detection circuit 403 and sends the processed signal to a quantization circuit 405 and a code amount estimation circuit 407. The code amount estimation circuit 407 estimates the amount of codes generated in the quantization by the quantization circuit 405, and determines a quantization coefficient to be used in the quantization circuit 407. The quantization circuit 405 quantizes the output of the DCT circuit 401 utilizing the quantization coefficient determined by the code amount estimation circuit 407, and sends the result to a variable length encoding circuit 409, which encodes the output of the quantization circuit with a known variable length encoding method such as Huffman encoding, and stores the obtained codes in the memory 113.

An error correction encoding circuit 411 executes error correction encoding by adding parity data to the video signal written into the memory 113. The error correction encoding circuit 411 also executes error correction encoding also on the audio signal written into the memory 113 as will be explained later. A recording process circuit 413 adds synchronization data and ID data to the video and audio signals subjected to the error correction encoding, and outputs the obtained signals to a recording circuit 121.

The recording circuit 121 converts the output signals of the compression process circuits 117, 119 into a form suitable for recording for example by digital modulation and records such signals on a tape 123.

Now reference is made to FIGS. 6, 7 and FIGS. 8A and 8B for explaining the function of the recording circuit 121.

Figure 6:
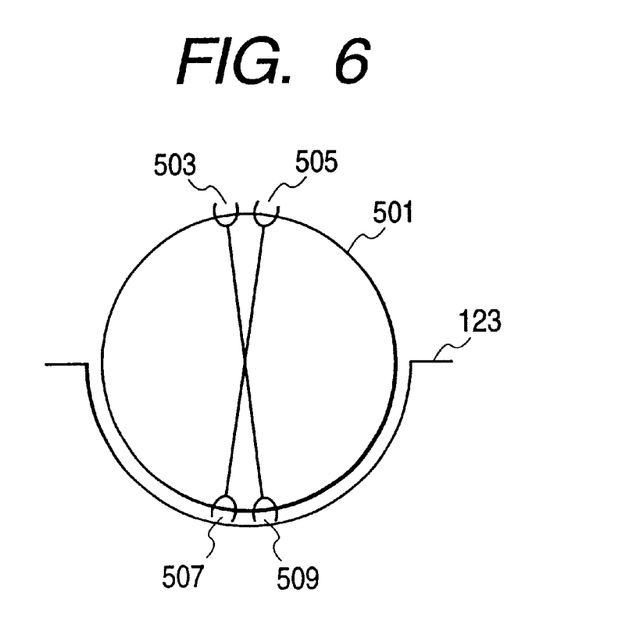
FIG. 6 is a view showing the head configuration of a recording circuit in FIG. 1.

FIG. 6 is a view showing the configuration around the recording heads in the recording circuit 121.

Referring to FIG. 6, magnetic heads 503, 505, 507, 509 are provided around a drum 501. The tape 123 is wound on the drum 501 over a range of about 180° thereof. The heads 503 and 509, and the heads 505 and 507 have a mutual phase difference of 180°. The heads 503 and 505 are different in the azimuth angle, but the heads 503 and 509 have a same azimuth angle and the heads 505 and 507 have a same azimuth angle.

Figure 7:
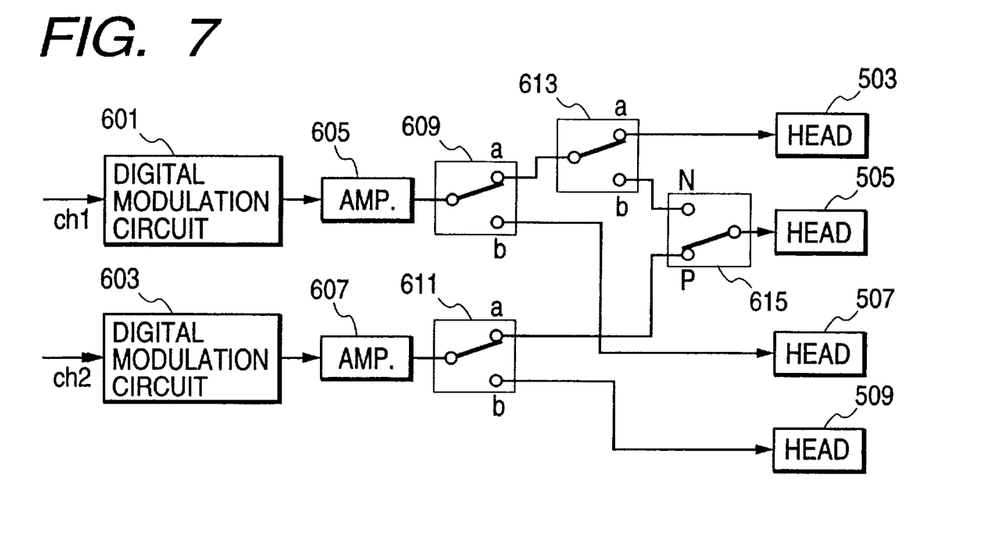
FIG. 7 is a block diagram showing the configuration of the recording circuit in FIG. 1.

FIG. 7 shows the configuration of the recording circuit 121. The signals of the channels 1, 2 respectively outputted from the compression process circuits 117, 119 are subjected to digital modulation such as NRZI in digital modulation circuits 601, 603 and supplied to switches 609, 611 through amplifiers 605, 607. The switches 609, 611 are controlled by the control unit 125 and are alternately connected to terminals a and b at every rotation of the drum 501 by 180° in the progressive recording mode to be explained later.

The signal outputted from the terminal a of the switch 609 is supplied, in the progressive recording mode, through the terminal a of a switch 613 to the head 503, while the signal outputted from the terminal b of the switch 609 is supplied to the head 507. The signal outputted from the terminal a of the switch 611 is supplied through a switch 615 to the head 505, while the signal outputted from the terminal b is supplied to the head 509.

The video cassette recorder of the present embodiment is provided with a progressive recording mode for recording the video signals of both channels 1 and 2, namely all the moving image of 60 frames per second obtained in the image pickup unit 101, on the tape 123, and a normal recording mode for recording the video signal of the channel 1 only, and, when the progressive recording mode is selected in an operation unit 127, the control unit 125 connects a switch 613 to the terminal a and a switch 615 to a terminal P, whereby the signals of the channels 1, 2 are recording in parallel in each trace of the heads 503, 505 or 507, 509.

Figure 8A:
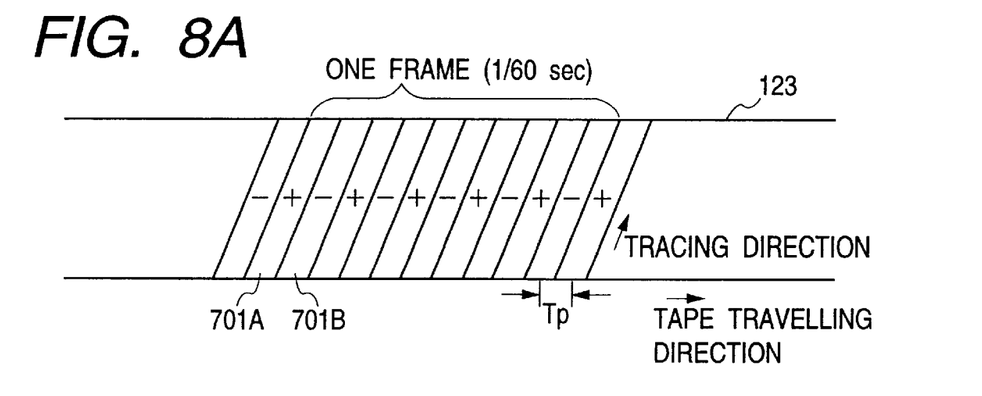
FIGS. 8A and 8B are views showing the recording format of the apparatus shown in FIG. 1.

FIG. 8A shows the tracks on the tape 123 in the progressive recording mode. In the present embodiment, the signal of a frame is recorded in 10 tracks. In FIG. 8A, tracks 701A of a plus azimuth are formed by the heads 503, 507 while tracks 701B of a minus azimuth are formed by the heads 505, 509. In the progressive recording mode, 10 tracks are formed with a track pitch Tp in 1/60 seconds to record the signals.

In the normal recording mode, the control unit 125 connects the switch 609 to the terminal a only and the switch 615 to the terminal N, and the switch 613 is alternately connected to the terminal a and b at every turn of the drum 501.

In the normal recording mode, the tape 123 is transported at a speed equal to a half of that in the progressive recording mode, and the recording is conducted solely with the heads 503, 505. The signal is supplied alternately to the heads 503 and 505 at every turn of the drum 501.

Figure 8B:
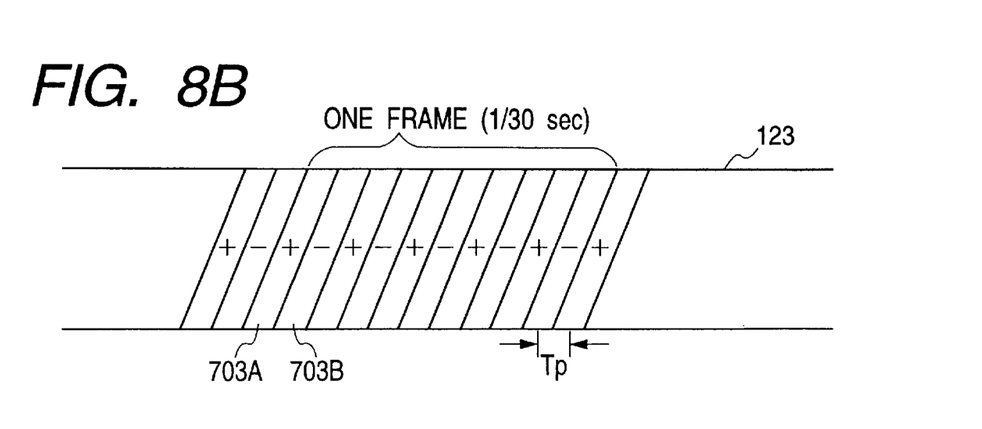

FIG. 8B shows the tracks on the tape 123 in the normal recording mode. Tracks 703A of a plus azimuth are formed by the heads 503 while tracks 703B of a minus azimuth are formed by the heads 505. Also in the normal recording mode, the signal of a frame is recorded in 10 tracks, but the tape 123 is transported at a speed equal to a half of that in the progressive recording mode and the recording is conducted with the heads 503, 505 only, so that the signal of one frame is recorded by forming 10 tracks of a track pitch Tp in 1/30 seconds.

Audio signal is processed in the following manner.

The audio signal obtained from a microphone 107 is amplified by an amplifier 109 and supplied to an audio signal process circuit 111, which converts the audio signal from the amplifiers 109 into a digital signal, rearranges it in a format suitable for recording and outputs the resulting signal to the memories 113, 115. The audio signal stored in the memories 113, 115 is processed as explained in the foregoing and is supplied, together with the video signal, to the recording circuit 121.

The digital video cassette recorder of the present embodiment is provided with a digital I/F 129 for outputting the video signal of the progressive images of the different channels, stored in the memories 113, 115, to a personal computer 10 in the compression encoded state.

The digital I/F 129 multiplexes the video signal of the channel 1, encoded by the variable length encoding circuit 409 in FIG. 5 and recorded in the memory 113, the video signal of the channel 2 similarly recorded in the memory 115 and the audio signal recorded in the memories 113, 115 by the audio signal process circuit 111, packetizes these signals by a predetermined data amount, converts the packets into a format based on the 1394 serial bus standard and outputs these packets to the external equipment 10.

In the present embodiment, the video signal is compressed according to the format of the consumer digital video cassette recorder determined by the digital VCR convention, in which the ordinary image of 60 fields are compressed to a data rate of 25 Mbps. Thus, in this case, the total data rate becomes about 50 Mbps, including the audio signal and the sub codes. In the present embodiment, as the video signal of 60 frames is compressed, the data rate becomes about 50 Mbps for the video signal only, or about 100 Mbps including the audio signal and the sub codes.

The interface based on the IEEE1394 serial bus standard is available in three transfer rates, namely about 100 Mbps (S100), 200 Mbps (S200) and 400 Mbps (S400). Consequently the interface of 200 Mbps can amply transmit the moving image signals in the form of progressive images, even when the video signal obtained from the progressive CCD is multiplexed with the audio signal and the sub codes.

When a request for the transmission of progressive images is supplied from the personal computer 10 through a terminal 131 to the digital I/F 129, it outputs a signal indicative of this effect to the control unit 125.

In response to the request from the personal computer 10, the control unit 125 controls the various units of the video cassette recorder in the aforementioned manner, thereby recording the compression encoded moving image signal and audio signal in the memories 113, 115 and outputs a control signal to the digital I/F 129 in order to transmit the signals stored in the memories 113, 115. In the progressive moving image transmission mode, the digital I/F 129 reads the compression encoded video signals of the progressive images of the channels 1 and 2, stored in the memories 113, 115 and also reads the audio signal stored in the memories 113, 115. It then packetizes these video and audio signals, effects conversion into the predetermined format according to the IEEE1394 serial bus standard, and outputs the converted signal to the personal computer 10 through the terminal 131.

As explained in the foregoing, the present embodiment allows to transmit the moving image signals in the form of progressive images (60 frame/sec) to the personal computer 10, which can display the transmitted video signals on the display in the form of the transmitted high-definition moving progressive images, without conversion into interlaced images.

When a request for the transmission of ordinary interlaced moving images is supplied from the personal computer 10, the control unit 125 outputs a control signal to the digital I/F 129 in order to transmit the signal stored in the memory 113. In response to the designation of the normal transmission mode from the control unit 125, the digital I/F 129 reads the compression encoded video signals of the channel 1 and audio signal stored in the memory 113, packetizes these signals, effects conversion into the predetermined format, and outputs the converted signal to the personal computer 10.

Such two transmission modes allow, for example, to transmit the image in the normal transmission mode for the ordinary image display, thereby reducing the burden on the apparatus and suppressing the electric power consumption, and to transmit the image in the progressive moving image transmission mode at a timing when the high-definition moving images are required.

As explained in the foregoing, the present embodiment outputs all the video signals obtained by the progressive CCD, without any skipping, to the personal computer 10 from the digital I/F 129, so that the advantage of such progressive CCD can be fully exploited when the video cassette recorder 1 is utilized as the image fetching device for the personal computer 10.

Also in recent years the progressive scanning is being employed in the television receivers, and, by connecting the video cassette recorder of the present embodiment with such progressive monitor instead of the personal computer 10, the progressive images obtained in the image pickup unit 10 can be monitored in the external display.

Furthermore, in the present embodiment, the transfer rate can be extremely low since the video and audio signals are transmitted in the compressed state.

Also in the present embodiment, the audio signal from the audio process circuit 111 is written into the both memories 113, 115 and the audio signal is multiplexed with the video signal of each channel, so that the audio can be obtained even in case the personal computer 10 utilized the video data of only one channel, among the data transmitted from the terminal 131 in the progressive moving image transfer mode.

In the present embodiment, it is also possible, by the digital I/F 129, to enter the signal from the personal computer 10. Prior to the transmission of the image signal, the personal computer 10 transmits a control signal, indicating the transfer of the progressive moving images, to the digital I/F 129 through the terminal 131. The digital I/F 129 transfers the control signal, from the personal computer 10, to the control unit 125, which in response outputs a control signal for causing the digital I/F 129 to receive the image signal from the personal computer 10 and a control signal for causing the recording circuit 121 to effect the recording operation.

The digital I/F 129 receives the packetized signals from the personal computer 10 through the terminal 131 and records the received signals in the memories 113, 115. The control unit 125 controls the compression process circuits 117, 119 and the recording circuit 121 to process and record the signals, transmitted from the personal computer 10 and stored in the memories 113, 115, in the aforementioned manner.

In the following there will be explained the reproducing operation.

Figure 9:
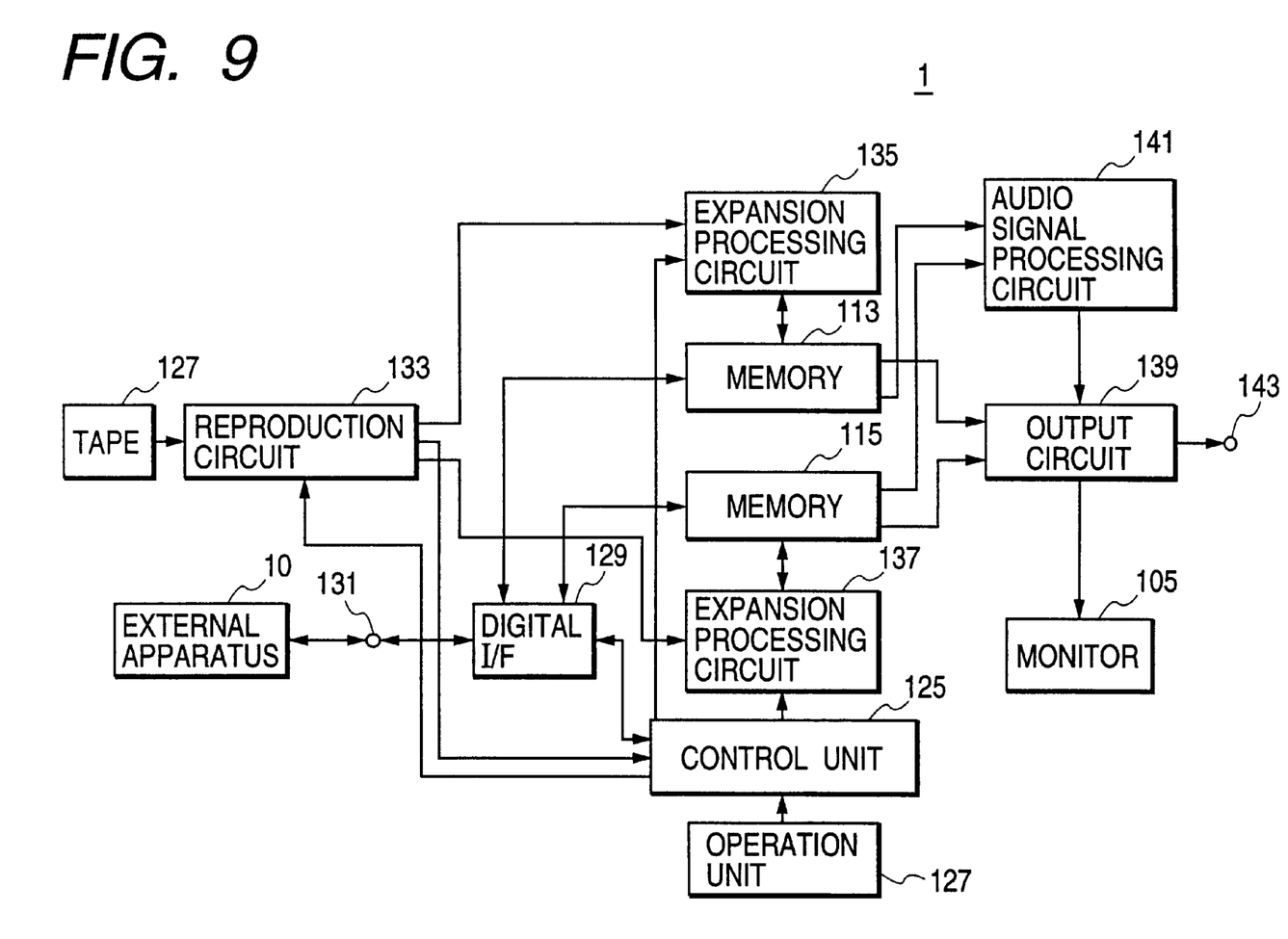
FIG. 9 is a block diagram showing the configuration of the reproducing system of a video cassette recorder in which the present invention is applicable.

FIG. 9 shows the configuration of the reproducing system of the VCR 1 shown in FIG. 1, and components equivalent to those in FIG. 1 are represented by the same numbers.

In response to an instruction for reproduction from the operation unit 127, the control unit 125 controls a reproduction circuit 133 to initiate the signal reproduction. In this operation, the progressive recording mode or the normal recording mode is distinguished by an addition signal recorded with the video signal, and the tape 123 is transported with a speed matching the distinguished mode. The heads are provided as shown in FIG. 6, and the heads to be used are suitably switched according to the distinguished mode.

In case the recording is in the progressive recording mode, the reproduction circuit 133 reproduces the signal from each trace of the heads 503, 505, 507 and 509, detects the original digital signal from thus reproduced signal, and outputs the signals of the channels 1, 2 respectively to the expansion process circuits 135, 137, which execute an expansion process matching the recording, respectively on the video signals of the channels 1 and 2.

Figure 10:
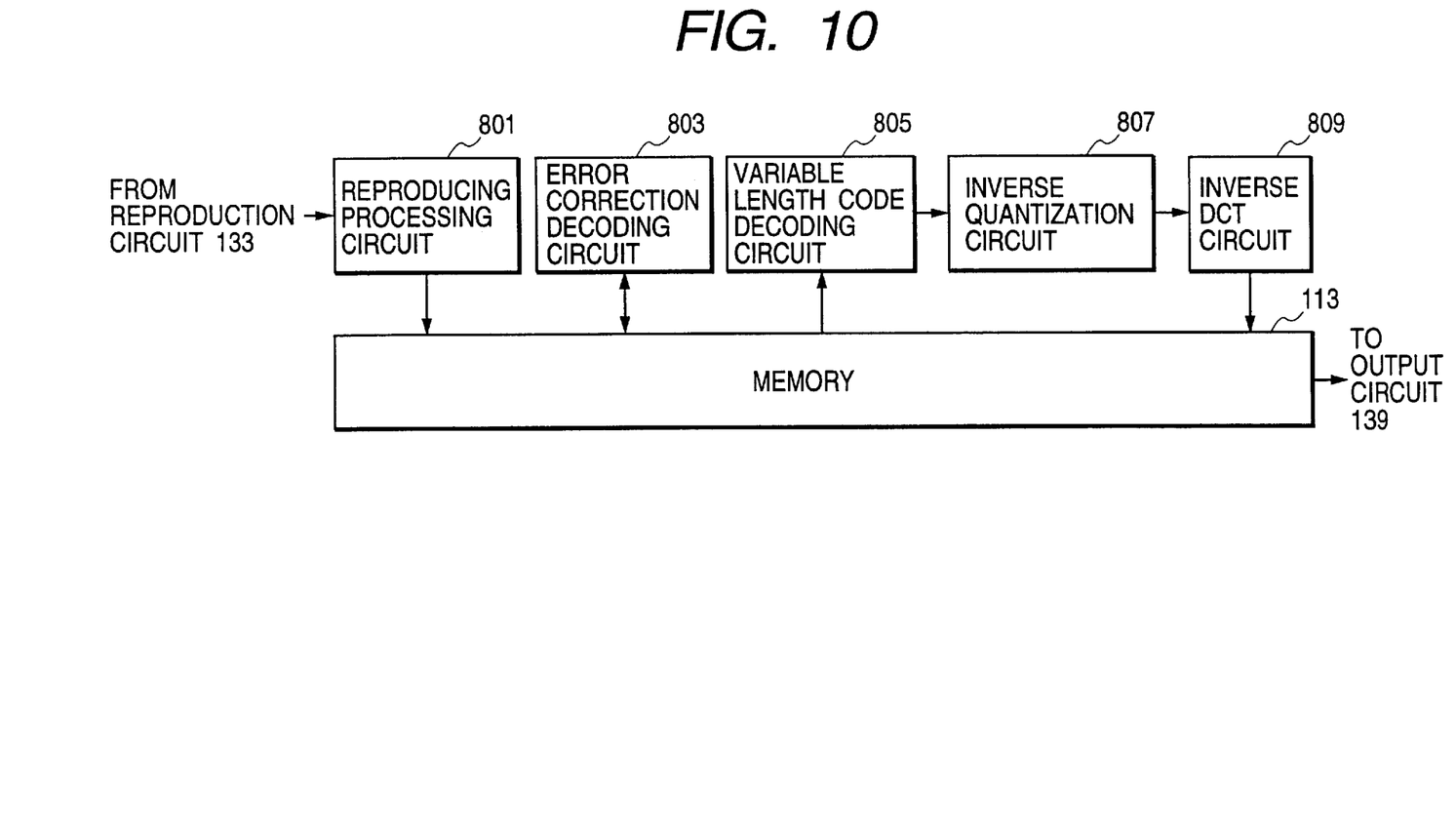
FIG. 10 is a block diagram showing the configuration of an expansion process circuit in FIG. 9.

The configuration of the expansion process circuits 135, 137 is shown in FIG. 10.

FIG. 10 shows the configuration of a principal part including the expansion process circuit 135. The expansion process circuit 137 will not be explained as it is also provided with a similar circuitry.

Referring to FIG. 10, a reproduction process circuit 801 detects the synchronization and ID data of the signal outputted from the reproduction circuit 133, and writes the reproduced signal in the memory 113 based on such data. It also detects additional data from the reproduced signal and sends such data to the control unit 125, which, as explained in the foregoing, distinguishes the recording mode based on the additional data released from the reproduction process circuit.

An error correction decoding circuit 803 effects an error correction decoding process on the reproduced signal stored in the memory 113, utilizing the parity data added at the recording, thereby correcting error in the reproduced signal. The reproduced video signal subjected to the error correction process is processed in succession by a variable length decoding circuit 805, an inverse quantization circuit 807 and an inverse DCT circuit 809 and is stored in the memory 113 after the data amount expansion.

The expanded video signals are outputted from the memories 113, 115 to an output circuit 139. Also the audio signal is read from the memories 113, 115, supplied to an audio process circuit 141 for conversion into the signal of a single channel, and supplied to an output circuit 139. The output circuit 139 multiplexes these video and audio signals, outputs the obtained signal to the exterior through a terminal 143, and also converts the video signals into RGB signals for supply to a monitor 105. In case the device connected to the terminal 143 is capable of processing progressive images, the output circuit 139 outputs the video signals in the form of progressive images, but, if the device is incapable of processing progressive images, the output circuit 139 converts the video signals into interlaced images of 30 frames or 60 fields per second.

Consequently, the present embodiment can output the reproduced video signals in the form of progressive images of 60 frames, or of interlaced images of 30 frames or 60 fields, according to the kind of the device connected to the terminal 143. Therefore, in case of still image reproduction or slow reproduction, the progressive images of 60 frames or the interlaced images of 30 frames may be selected to obtain a still image or a slow reproduced image of high definition without image blur. Also in case of moving image reproduction, the progressive images of 60 frames or the interlaced images of 60 fields may be selected to obtain a reproduced moving image with smooth movement.

Also the illustrated reproduction system is capable of bidirectional signal exchange with the digital I/F 129.

More specifically, it is possible to output the reproduced signal, reproduced by the reproduction circuit 133 and stored in the memories 113, 115, to the digital I/F 129 in the compression encoded state in the progressive moving image transmission mode or in the normal transmission mode in response to the request from the personal computer 10, and to transmit such signal to the personal computer 10 after packetizing and formatting in the digital I/F 129 in the aforementioned manner. It is also possible to process the signals, transmitted from the personal computer 10, in the expansion process circuits 135, 137 and to output to the exterior through the terminal 143.

The apparatus shown in FIG. 1 or 10 is provided with the compression process circuits or the expansion process circuits of two systems, and these circuits of two systems are utilized for recording and reproduction of the signals on or from the tape 123 within a single apparatus.

It is however also possible to constitute an image pickup apparatus for example with the image pickup unit 101 and the camera signal process circuit 103 shown in FIG. 1 and to record or reproduce the video signals of two channels, obtained from such image pickup apparatus, with two video cassette recorders.

Figure 11:
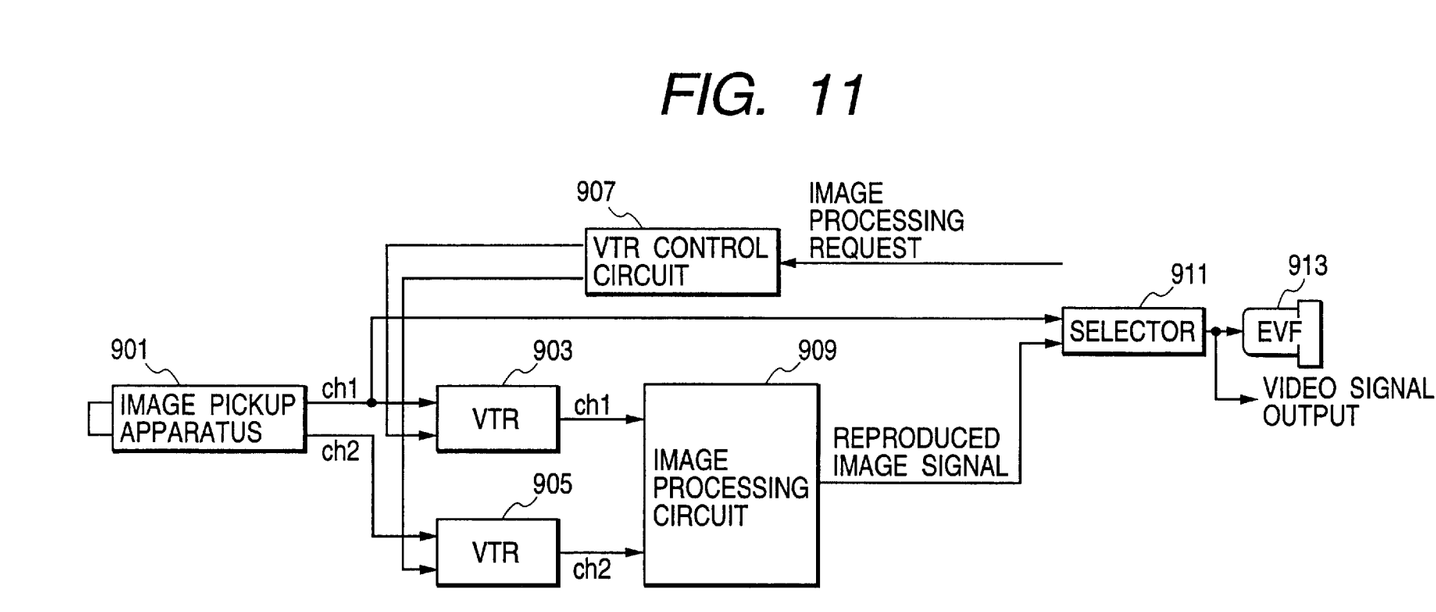
FIG. 11 is a block diagram showing the configuration of a system in which the present invention is applicable.

FIG. 11 shows the configuration of such system.

In FIG. 11, an image pickup apparatus 901 is composed of the image pickup unit 101 and the camera signal process circuit 103 shown in FIG. 1, and outputs progressive image video signals of two channels (ch1, ch2). The video signal of the channel 1 is supplied to a VCR 903 and a selector 911, while the video signal of the channel 2 is supplied to a VCR 905. Each of the VCR's 903, 905 is provided with a single system of the compression process circuit and the expansion process circuit shown in FIGS. 5 and 10. In case a normal recording mode is instructed by a control circuit 907, the VCR 903 alone records the video signal of the channel 1, and the VCR 905 records the video signal of the channel 2 when a progressive recording is instructed by the control unit 907. Consequently the recording by the VCR 905 is conducted only when intended by the user, whereby the tape consumption can be reduced.

In case of executing electronic zooming, for example of magnification of 2 times, in the image reproduction, in order to avoid the image blur resulting from the motion of the object, the pitch of the pixels of a field image is enlarged twice and interpolation utilizing the surrounding pixels is conducted in a portion where the pixel is missing by the enlargement as explained before.

In case the electronic zooming is requested at the reproduction in the system shown in FIG. 11, the control unit 907 controls the VCR's 903, 905 in such a manner that they reproduce signals in mutual synchronization. Thus the VCR's 903, 905 respectively reproduce the video signals of the channels 1, 2 for supply to an image process circuit 909. In this operation, the VCR 905 outputs the video signal of an odd (or even) field of a frame same as that of the field image of the channel 1 reproduced from the VCR 903.

The field images of two channels outputted from the VCR's 903, 905 substantially constitute images of a same frame, and the image process circuit 909 executes the electronic zooming on such frame to provide an electronically zoomed image of high quality, without loss in the vertical resolving power.

Also, when the electronic zooming is request, if the video signal of the channel 2 is not recorded by the VCR 905 corresponding to the field image of the channel 1 recorded in the VCR 903, the field image of the channel 1 alone, outputted from the VCR 903, is utilized to interpolate the image of another field, thereby effecting the electronic zooming.

The video signal to an EVF (electronic view finder) 913, for observing image at the recording or reproduction, is obtained by selecting, by a selector 911, the video signal of the channel 1 from the image pickup apparatus 901 or the output signal from the image process circuit 909. In the imaging taking (recording) operation, the video signal of the channel 1 from the image pickup apparatus 901 is selected, and, at the reproduction, the video signal from the image process circuit 909 is selected.

The image process circuit 909 outputs, in the normal reproducing operation, the video signal of the channel 1 reproduced from the VCR 903, but, in the electronic zooming, slow reproduction of still image reproduction, outputs the video signal interpolated as explained in the foregoing or the synthesized video signal with the reproduced video signal from the VCR 905. Also it outputs the video signal from the selector 911 for the external monitor.

The configuration shown in FIGS. 1 and 11 employs a CCD providing progressive images of a single channel, but there may also be employed a CCD providing video signals of two channels.

Figure 12:
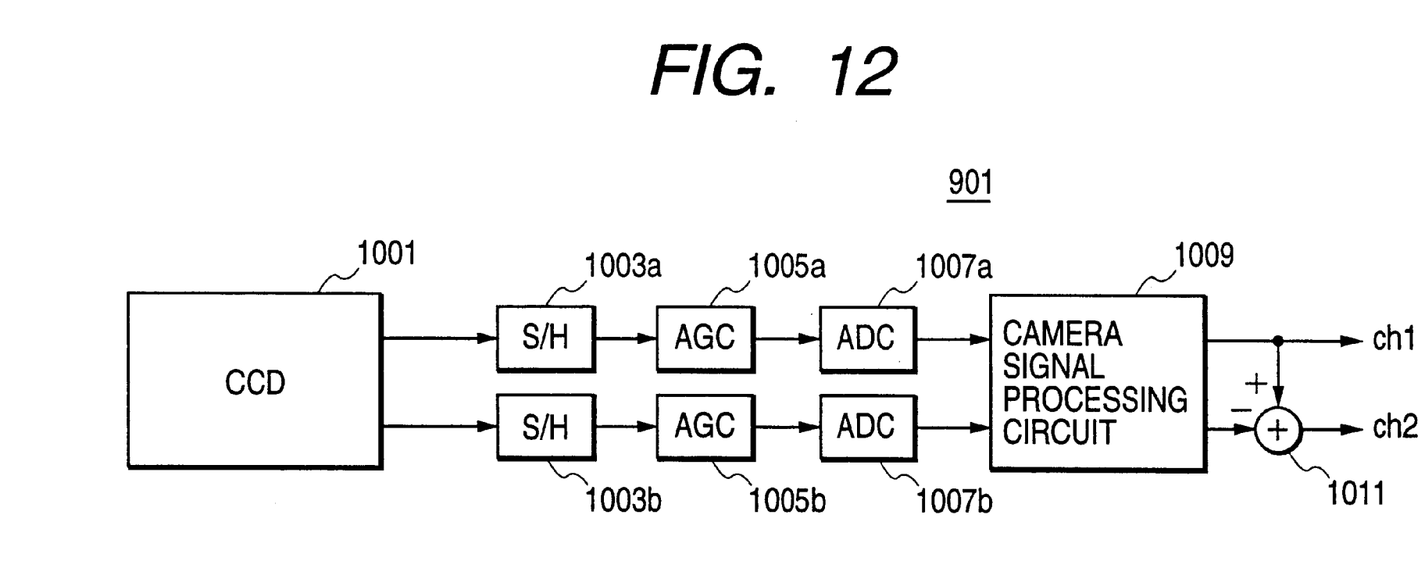
FIG. 12 is a block diagram showing another configuration of the image pickup device in FIG. 11.

FIG. 12 shows the configuration of an image pickup apparatus 901 employing a progressive CCD with two output channels.

Referring to FIG. 12, a CCD 1001 outputs the information of all the pixels on the image receiving face in a field period (1/60 seconds), outputting the signal of odd lines as the signal of channel 1 and that of even lines as the signal of channel 2. The video signals of two channels are supplied, through sample-hold circuits 1003*a*, 1003*b*, AGC circuits 1005*a*, 1005*b* and A/D converters 1007*a*, 1007*b* to a camera signal process circuit 1009. The camera signal process circuit 1009 is provided with gamma correction circuits, color separation circuits and white balancing circuits of two systems and outputs the video signals of channels 1, 2 after these processes. In the configuration shown in FIG. 12, a subtractor 19 obtains the difference between the video signals of the channels 1 and 2 and outputs the obtained difference as the signal of a new channel 2.

Such configuration allows to reduce the amount of information of the video signal of the channel 2.

At the reproduction, the high-definition progressive images can be restored by adding the reproduced difference signal of the channel 2 to the video signal of the channel 1.

In the apparatus shown in FIG. 1, the video signals of the channels 1 and 2, released from the camera signal process circuit 103, are written into the memories 113, 115, then compression encoded and recorded, but it is also possible, as shown in FIG. 12, to record the difference signal of the video signals of the channels 1 and 2 as the video signal of a new channel 2. In such case, as the amount of data of the channel 2 is much less than that of the channel 1, the signal of the channel 2 can be recorded in the sub code area, instead of the video signal area, of each track.

Figure 13:
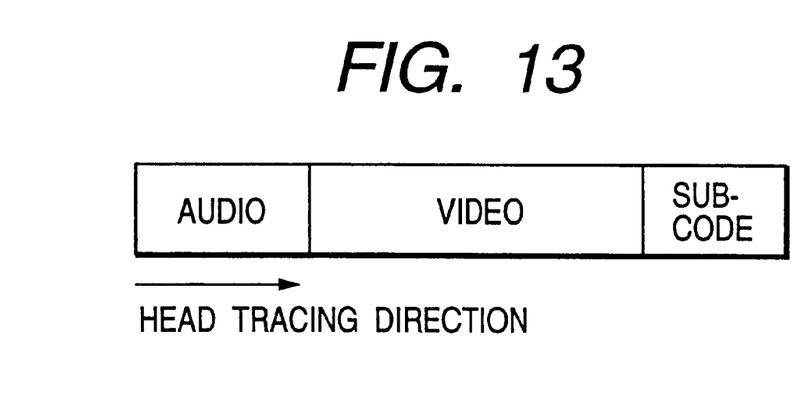
FIG. 13 is a view showing the recording format on the tape in FIG. 1.

FIG. 13 shows the track format in the VCR shown in FIG. 1.

The recording areas for the audio signal, the video signal and the sub code are provided in the tracing order of the heads. In the above-mentioned case, the transporting speed of the tape and the method of switching of the heads are selected same as in the normal recording mode in the VCR shown in FIG. 1, and the video signal of the channel 1 is recorded in the video recording area while the differential signal is recorded in the sub code area.

Such configuration allows to record the progressive images while reproducing the tape consumption.

The apparatus shown in FIG. 1 records the video signals on a magnetic tape, but it is also possible to record the video signals on a disk-shaped recording medium such as a magnetooptical disk.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image apparatus comprising:
   image pickup means for obtaining image information with an image pickup device of progressive scan type, and outputting a corresponding video signal consisting of two field images in a mutually interlacing relationship within a same frame, as video signals of two channels, each of the video signals of two channels consisting of a plurality of fields;
   compression means of two systems for respectively compressing the amount of information of the video signals of two channels outputted from said image pickup means; and
   transmission means for transmitting the video signals of two channels compressed by said compression means of two system to a peripheral device in the compressed state, said transmission means transmitting the video signals of two channels without omitting the plurality of fields of each of the video signals of two channels.

2. An apparatus according to claim 1, wherein:
   said image pickup means is adapted to output the video signal consisting of two field images in a mutually interlacing relationship within a same frame, as said video signals of two channels.

3. An apparatus according to claim 2, further comprising:
   display means for displaying the image of the video signal of a channel, among said video signals of two channels.

4. An apparatus according to claim 1, wherein:
   said image pickup means is adapted to determine the difference of said two field images and output the video signal of one of said two field images and said difference signal as said video signals of two channels.

5. An apparatus according to claim 1, further comprising:
   audio generation means for generating an audio signal with a microphone, wherein said transmission means is adapted to multiplex said audio signal respectively with said video signals of two channels for transmission.

6. An apparatus according to claim 1, wherein:
   said transmission means has a first transmission mode for transmitting said video signals of both of two channels, and a second transmission mode for transmitting the video signal of either channel only of said video signals of two channels.

7. An apparatus according to claim 1, wherein:
   said transmission means is adapted to transmit said video signals in a format according to the IEEE1394 serial bus standard.

8. An apparatus according to claim 1, wherein:
   said peripheral device includes a personal computer.

9. An apparatus according to claim 1, wherein:
   said peripheral device includes a display device of progressive scan type.

10. An apparatus according to claim 1, further comprising:
    recording means for recording the video signals of two channels, compressed by said compression means, on a recording medium.

11. An apparatus according to claim 10, wherein:
    said recording means has a first recording mode for recording said video signals of both of two channels, and a second recording mode for recording the video signal of either channel only of said video signals of two channels.

12. An apparatus according to claim 11, wherein:
    said recording means is adapted, in said first recording mode, to transport said recording medium at a first speed, and, in said second recording mode, to transport said recording medium at a speed lower than said first speed in said first recording mode.

13. An apparatus according to claim 10, wherein:
    said transmission means is capable of entering the video signals, transmitted in compressed state from said peripheral device; and
    said recording means is capable of recording the video signals, entered by said transmission means, on said recording medium.

14. An apparatus according to claim 10, wherein:
    said recording medium includes a magnetic tape.

15. An apparatus according to claim 10, wherein:
    said recording medium includes a disk-shaped recording medium.

16. An imaging apparatus comprising:
    image pickup means for generating, utilizing moving image information of non-interlaced images of n frames per second (n being an integer at least equal to 2) obtained by an image pickup device of progressive scan type, a first video signal consisting of mutually interlaced n fields per second and a second video signal representing the non-interlaced images of n frames per second;
    compression means for compressing an amount of information of the video signals obtained from said image pickup means; and
    transmission means for transmitting the video signals, compressed by said compression means, to a peripheral device in the compressed state;
    wherein said transmission means has a first transmission mode for transmitting said first video signal consisting of mutually interlaced n fields per second in said compressed state and a second transmission mode for transmitting said second video signal representing the non-interlaced images of n frames per second in said compressed state.

17. An apparatus according to claim 16, wherein:
    said image pickup means is adapted to generate, utilizing said moving image information, video signals of two channels consisting of two field images in a mutually interlaced relationship in a same frame, to obtain said first video signal utilizing only one of said video signals of two channels and to obtain said second video signal utilizing both of said video signals of two channels.

18. An apparatus according to claim 16, wherein:

said image pickup device is adapted to sequentially output the image information of a frame as the signal of a channel, and said image pickup means includes conversion means of a channel for converting said image information of a channel into a digital signal.

19. An apparatus according to claim 16, wherein:

said image pickup device is adapted to output the image information of a frame as signals of two channels, namely a first signal consisting of image information of odd-numbered lines and a second signal of image information of even-numbered lines, and said image pickup means includes first conversion means for converting said first signal into a digital signal and second conversion means for converting said second signal into a digital signal.

20. An apparatus according to claim 16, wherein:

said compression means includes a memory, a high efficiency encoding circuit for applying the video signals outputted from said image pickup means for writing into said memory, and an error correction encoding circuit for applying an error correction encoding process on the high efficiency encoded video signals stored in said memory, and said transmission means is adapted to transmit the video signals, written into said memory by said high efficiency encoding circuit, to said peripheral device.

21. An apparatus according to claim 16, further comprising:

recording means for recording, in a recording medium, said second video signal representing the non-interlaced images of n frames per second compressed by said compression means;

reproducing means for reproducing said second video signal representing the non-interlaced images of n frames per second from said recording medium, wherein said transmission means further transmits said second video signal representing the non-interlaced images of n frames per second, reproduced by said reproducing means, to said peripheral device in said compressed state.

22. An apparatus according to claim 21, wherein said peripheral device includes a television monitor of progressive scan type.

\* \* \* \* \*

UNITED STATES PATENT AND TRADEMARK OFFICE
CERTIFICATE OF CORRECTION

PATENT NO.   : 6,374,039 B1
DATED        : April 16, 2002
INVENTOR(S)  : Taizo Hori et al.

It is certified that error appears in the above-identified patent and that said Letters Patent is hereby corrected as shown below:

<u>Column 1,</u>
Line 14, "in" should read -- in an --.

<u>Column 2,</u>
Line 42, "embodiment," should read -- embodiments, --.

<u>Column 5,</u>
Line 52, "terminal" should read -- terminals --.

<u>Column 7,</u>
Line 40, "the both" should read -- both --.

<u>Column 9,</u>
Line 34, "such" should read -- such a --; and
Line 66, "same" should read -- the same --.

<u>Column 10,</u>
Line 64, "such" should read -- such a --.

<u>Column 11,</u>
Line 7, "same" should read -- the same --; and
Line 39, "system" should read -- systems --.

<u>Column 12,</u>
Line 8, "of" should read -- of a --.

UNITED STATES PATENT AND TRADEMARK OFFICE
CERTIFICATE OF CORRECTION

PATENT NO. : 6,374,039 B1
DATED : April 16, 2002
INVENTOR(S) : Taizo Hori et al.

It is certified that error appears in the above-identified patent and that said Letters Patent is hereby corrected as shown below:

Column 14,
Line 11, "means;" should read -- means; and --; and
Line 22, "of" should read -- of a --.

Signed and Sealed this

Eighteenth Day of February, 2003

JAMES E. ROGAN
*Director of the United States Patent and Trademark Office*